US007318590B2

(12) United States Patent
Razavi

(10) Patent No.: US 7,318,590 B2
(45) Date of Patent: *Jan. 15, 2008

(54) PATTERN ADHESIVE SEAL PRODUCTS AND METHOD OF PRODUCTION

(76) Inventor: Ali Razavi, Boulevard Business Park, Unit 4C, 1200 Southwest Blvd., Vineland, NJ (US) 08360

( * ) Notice: Subject to any disclaimer, the term of this patent is extended or adjusted under 35 U.S.C. 154(b) by 17 days.

This patent is subject to a terminal disclaimer.

(21) Appl. No.: 10/460,213

(22) Filed: Jun. 13, 2003

(65) Prior Publication Data

US 2004/0032093 A1 Feb. 19, 2004

Related U.S. Application Data

(60) Provisional application No. 60/389,480, filed on Jun. 19, 2002.

(51) Int. Cl.
*F16J 3/00* (2006.01)

(52) U.S. Cl. ........................................ 277/628; 422/99

(58) Field of Classification Search .................. 422/99, 422/61; 277/628

See application file for complete search history.

(56) References Cited

U.S. PATENT DOCUMENTS

| | | | | |
|---|---|---|---|---|
| 4,824,702 | A * | 4/1989 | Straub | 428/15 |
| 5,741,463 | A * | 4/1998 | Sanadi | 422/101 |
| 5,916,671 | A * | 6/1999 | Dauber et al. | 428/317.3 |
| 6,057,414 | A * | 5/2000 | Razavi | 427/491 |
| 6,099,682 | A * | 8/2000 | Krampe et al. | 156/289 |
| 6,287,658 | B1 * | 9/2001 | Cosentino et al. | 428/40.1 |
| 6,344,260 | B1 * | 2/2002 | Lythgoe et al. | 428/195.1 |
| 6,682,702 | B2 * | 1/2004 | Barth et al. | 422/102 |
| 7,037,580 | B2 * | 5/2006 | Razavi et al. | 428/343 |
| 2003/0077207 | A1 * | 4/2003 | Tyndorf et al. | 422/102 |

* cited by examiner

*Primary Examiner*—John Kreck
(74) *Attorney, Agent, or Firm*—Birch, Stewart, Kolasch & Birch, LLP

(57) ABSTRACT

The present invention is drawn to a method of making a sealing product, by a) selecting an a sealing material of an optimum film, mat or multi-well plate surface material for a specific sealing application; b) treating the sealing material; and c) directly coating the sealing material with an adhesive in a pattern format using Gravure, screen, rotary screen, flexographic, pad printing or dry transfer techniques. The present invention is further drawn to a sealing product made using the aforementioned method.

13 Claims, 3 Drawing Sheets

PATTERN ADHESIVE SEAL PRODUCTS AND METHOD OF PRODUCTION

This application claims priority on provisional Application No. 60/389,480 filed on Jun. 19, 2002, the entire contents of which are hereby incorporated by reference.

FIELD OF THE INVENTION

The present invention is drawn to an improved sealing product and a method of producing such products.

BACKGROUND OF THE INVENTION

Multi-well plates and tube arrays are used extensively in a variety of laboratory and pharmaceutical applications, including, but not limited to: experimental assays, sorbent assays, high-throughput screening (HTS) assays, combinatorial chemistry, drug discovery, drug metabolism studies, liquid chromatography with tandem mass spectrometry (LC-MS-MS), cell culture, tissue culture, PCR analysis.

Multi-well plates and tube arrays are commercially available from any sources, typically in 4-, 6-, 12-, 24-, 48-, 96-, 384-, and 1536-well design. The foot print dimensions of these plates are maintained as constant measurements, with the only variation in design being in the number of the wells per plate. There are a variety of sealing films with adhesive backing that commercially available for sealing the surface of multi-well/multi-tube array for different applications. These sealing films can be heat-sealed or adhered to the surface of the plate by pressure application. These sealing films for sealing multi-well plates with adhesive backing are typically made from aluminum foil, polyester, polypropylene, etc, and are available in single-layer, multi-layer or roll form. However, the current film materials and methods for sealing multi-well plates with adhesive backed films have many significant drawbacks, including adhesive contact with content of the wells, contamination of needles with adhesive when penetrating through sealing films to access the contents of the wells, limited chemical resistance to many solvent-based solutions in the wells such as DMSO-containing solutions, leaching of plasticizer present in the sealing films by the well contents, and condensation into the well area during thermo-bonding of the sealing film to plate.

Alternatively, the wells may be sealed by placing flexible rubber mats with raised dimples on the surface of the mat in an array, which matches exactly the array of the wells. Each dimple is sized and shaped to fit firmly into the wells. However, this sealing method using dimples has limited usage due to the constraint of well size and geometry related to the plate design. Specifically design and manufacture of a mat with dimples matching the plate becomes extremely difficult when the mat requires more than 96 wells per plate.

Patterned adhesive application with a microwave popcorn package was described in U.S. Pat. No. 5,928,554 to Olson et al. The popcorn package in the '554 patent is generally made of plies of a flexible material, such as paper, bonded or adhered to one another, with microwave interactive construction between the plies. The laminating adhesive between the plies is applied in a preferred pattern by application of Gravure, or flexography. U.S. Pat. No. 3,847,725 to Hochner, U.S. Pat. No. 4,111,734 to Rosenfield, U.S. Pat. No. 5,587,214 to Mitchell and U.S. Pat. No. 4,654,251 to Kada, describe Dry Transfer material made of a carrier sheet, which may include a polymeric coating or a release chemical treatment, with inked indices printed thereon and continuous pressure sensitive adhesive overlying on the indicia. This assembly then can be transferred to other surfaces by self-adherent properties of the adhesives. Pattern printing of adhesives is also described in U.S. Pat. No. 6,344,260 B1 to Lythgoe. A decalcamania or dry transfer is disclosed in which a design indicium is supported on a flexible carrier sheet and a pressure sensitive adhesive is applied to the indicium and to the surrounding surface of the carrier sheet in a pattern of discrete dots using screen printing. By applying the adhesive as a pattern of dots, the adhesive shears cleanly around the perimeter of the indicium when the indicium is transferred from the carrier sheet to a receptor surface.

The present invention adopts Gravure, screen, Rotary Screen, flexography, and pad printing or die cutting of transfer adhesive film to desired format, followed by dry transfer to any desired materials. This invention provides sealing solutions for use with multi-well plate products, including multi-well plates surfaces, with adhesive free areas, which are not in contact with the well contents when sealing films adhere to plate.

SUMMARY OF THE INVENTION

The present invention relates to coating of any desired substrate materials directly or by a dry transfer process. The present invention further pertains to sealing products in sheet or roll format, for multi-well plate and/or multi-tube array surfaces wherein the specific adhesive is applied in pattern format, including but not limited to 4-, 6-, 12-, 24-, 48-, 96-, 384- and 1536-geometry using gravure, screen, rotary screen, flexographic, and pad printing, or alternatively by die cutting the transfer adhesive film to any desired format followed by dry transfer of the adhesive pattern to any desired materials.

This invention further provides a sealing solution for multi-well plate products with an adhesive free design, which is essential for specific applications regardless of temperature and other restraints.

DETAILED DESCRIPTION OF INVENTION

Multi-well plates are commercially available with 4-, 6-, 12-, 24-, 48-, 96-, 384-, and 1536-well designs. The footprint dimensions of these plates typically remains constant, with the only variation design being the number of wells per plate. A 96 multi-well plate is one popular standard, which comes with an 8×12 array of wells. The cross-sectional area of the wells may be circular, rectangular, or any specific geometry desired.

Figure 1:
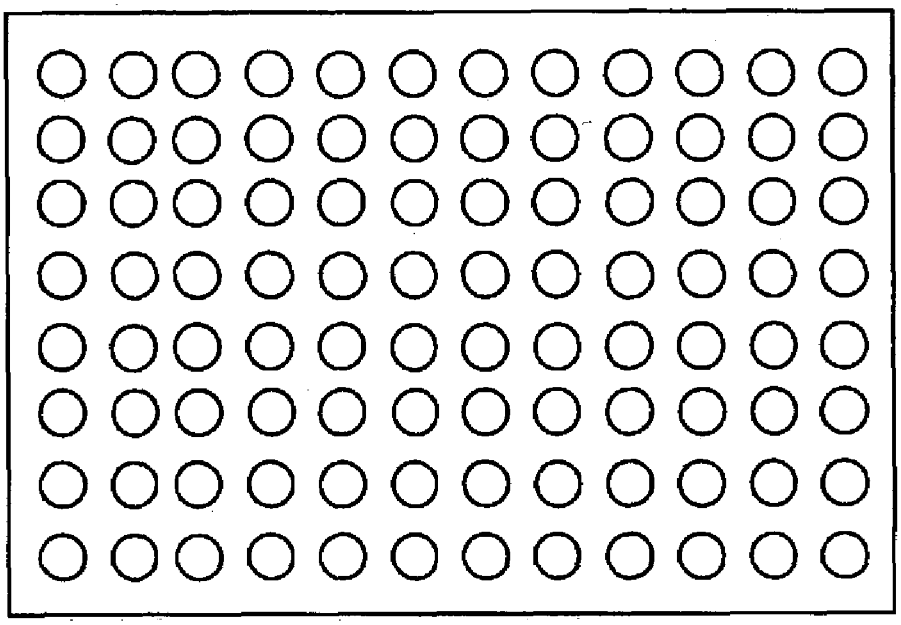
FIG. 1 is a schematic of a front view area of a typical 96 well plate.

FIG. 1 is a schematic of a front view area of a typical 96 well plate, having circular 8×12 wells located in a specific array. Each circle is indicative of the diameter of each well arranged in a specific area. The purpose of this invention is to duplicate exactly the pattern of a multi-well plate.

Thus, for the present invention, the well-pattern exemplified in FIG. 1, or any other design, is duplicated by first selecting optimum films, mat or multi-well plate surface materials for specific sealing applications. The film/mat material is typically a fluorinated or non-fluorinated material including, but not limited to perfluoroalkoxy tetafluoroethylene copolymer resin (PFA), ethylenechlorotrifluoroethylene copolymer resin (E-CTFE), ethyleneterafluoroethylene copolymer resin (E-TFE), polychlorotrifluoroethylene (CTFE), polyvinylidine fluoride (PVDF), tetrafluoroethylene-hexafluoropropylene (FEP), polytetrafluoroethylene (PTFE), expanded PTFE, porous PTFE, woven glass impregnated with PTFE, skived, skived plus calendared PTFE, ACLAR homopolymer, ACLAR copolymer, DYneon TFM, polyimides (KAPTON), polyolefins (such as low and high density polyethylene and polypropylene), acrylic polymers and copolymers (such as polyacrylate, polymethylmethacrylate and polyethylacrylate), vinyl halide polymers and copolymers (such as polyvinylidene fluoride, polyvinylidene chloride, polyacrylonitrile, polyvinyl acetate), ethylene-methyl methacrylate copolymers, acrylonitrilestyrene copolymers, ABS resins, ethylene-vinyl acetate copolymers, natural and synthetic rubbers, butadienestyrene copolymers, polyisoprene, synthetic polyisoprene, polybutadiene, butadiene-acrylonitrile copolymers, polychioroprene rubbers, polyisobutylene rubber, ethylenepropylene rubber, ethylene-propylene-diene rubbers, isobutylene-isoprene copolymers, polyurethane rubbers, polyamides (such as NYLON 66 and polycaprolactam), polyesters (such as polyethylene terephthalate, polycarbonates, polyimides and polyethers), polyolefins, fluoropolymer laminates, Barex and Barex laminates.

Multi-well plates are commercially available with 4-, 6-, 12-, 24-, 48-, 96-, 384-, and 1536-well designs and are generally made of polyolefins, including but not limited to, polystyrene, polypropylene and others in virgin state or mixed with other materials in order to provide clear, white and/or black micro-plates, having full-, semi- and non-skirted side profiles among the others. The foot-print dimensions of these plates typically remains constant, with the only variation design being the number of wells per plate and the associated desired well volume intended for different applications.

The sealing film is then treated to any desired depth and degree of functionality using chemical, plasma treatment, such as by the techniques disclosed in U.S. Pat. No. 6,057,414, corona, flame treatment, mechanical treatment or by adding or mixing wetting agents as a mixture with or coating to desired substrate materials in order to accept any specific adhesive including but not limited to, water based, solvent based, heat activated, and/or UV curable adhesives, which may be colored or in their transparent virgin color.

The film and/or mat materials are coated with the desired adhesive in pattern format including but not limited to 4-, 6-, 12-, 24-, 48-, 96- 384- or 1536-well geometry by using Gravure, flexography, screen, rotary screen, or pad printing methods or alternatively by die cutting of the transfer adhesive film to the desire pattern format, followed by dry-transfer to any required substrate materials, such as that exemplified in FIG. 1.

Using the above described procedure sealing products can be made, which are adhesive free on the specific target areas of contact to multi-plate well surface and could be used for solvent and chemical resistance sealing application including resistance to DMSO by application of fluoropolymeric materials, moisture barrier seal, oxygen barrier seal, resealable dimple free mat, gas permeable seals, clear and transparent seals, high or low temperature seals, low protein binding seal, tamper evidence seal, multi-well plate with self sealing properties, and other applications.

Figure 2:
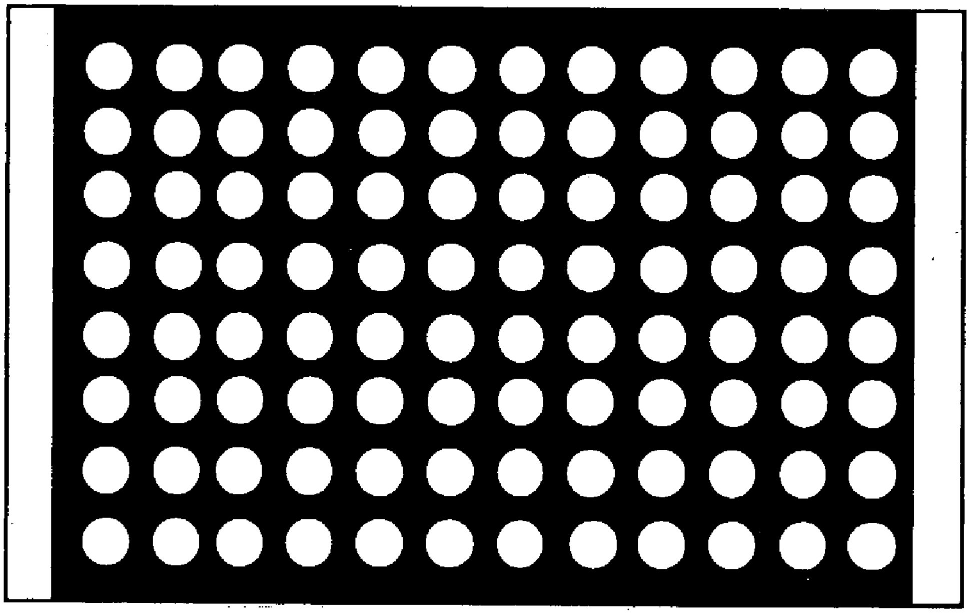
FIG. 2 is a schematic of a sealing film or mat of the present invention.
Figure 3:
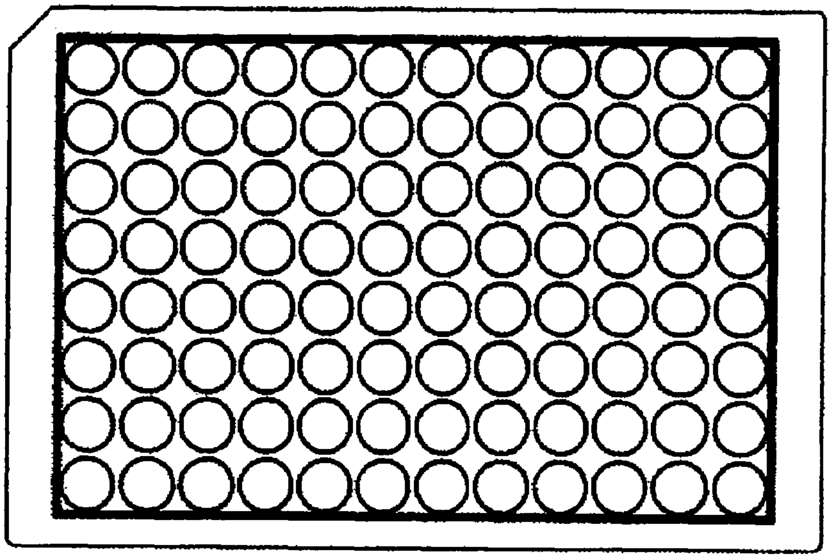
FIG. 3 is a schematic drawing of a sealing product of the invention that has a pattern adhesive design applied to the periphery of adhesive free wells and outer periphery of sealing products in the shape of connected-donut shape.
Figure 4:
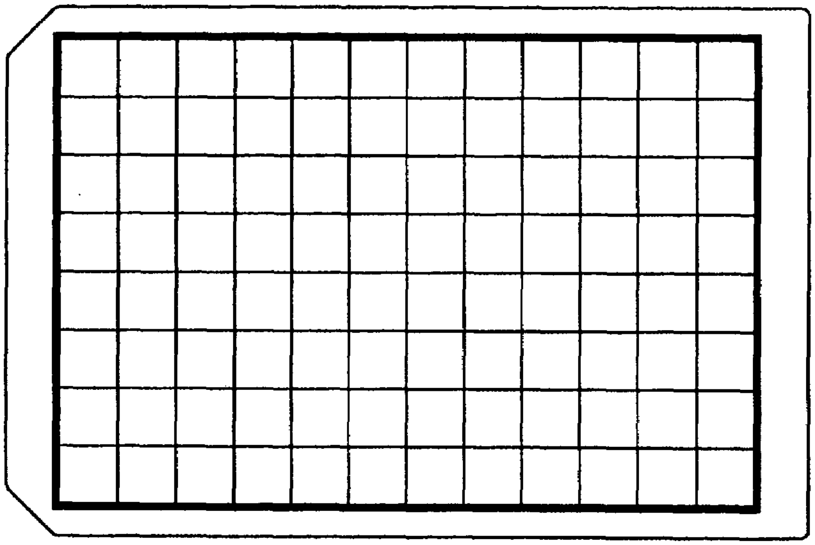
FIG. 4 is a schematic drawing of the sealing product depicted in F*ig*. 3, having a rectangular perimeter.

FIG. 2 is a schematic of a sealing film or mat based on the invention. Adhesive-free circles are exactly identical to micro-plate's wells. The rest of the areas including the periphery of the wells (black areas) provide adhesive sealing surfaces between films or mats on multi-well plates.

As noted, multi-well plates are commercially available in 4-, 6-, 12-, 24-, 48-, 96- 384- and 1536-wells. The wells are connected together and attached to outer periphery of the plate by variety of desired geometries intended for different applications. As a result of these options, a variety of topographical well profiles with the outer border of the plate shape, including but not limited to raised well rims, flat well rims, well to well connection with open areas, and others would constitute the variety of surface profiles and outer plate shapes. In order to optimize the intended sealing properties of the sealing products to any desired multi-well plate topography, the periphery of the wells including the outer periphery of the seal product could be coated either with connected, continuous adhesive, or with any desired pattern adhesive format design. As such, many options are available in designing the periphery of adhesive-free well areas and the outer periphery of the sealing products with pattern adhesives, which match with multi-well plate's topographical design in order to achieve optimum sealing solution. The above option then provides unlimited pattern adhesive designs for periphery of adhesive free wells and outer periphery of sealing products including but not limited to: connected donut shape, disconnected donut shape, rectangular perimeter, triangular perimeter and connection to outer border and other geometries and combinations.

EXAMPLE #1

A 12 inch wide Gravure system, having a 15 inch diameter coating cylinder with a 96-well pattern engraved into and below the surface of printing cylinder, an impression roller which brings the web of substrate materials into contact with gravure cylinder, a doctor blade which recovers excess adhesive from the surface of coating cylinder and adhesive reservoir in which the cylinder is immersed was used in this trial run. Water based pressure sensitive adhesive with approximately 60% solid content and with associated 2500-5000 centipoises viscosity were employed. The 2 and 5 mil PFA films treated on one surface in accordance with the teachings of U.S. Pat. No. 6,057,414 were used for this printing run. The wet deposited 96 patterns adhesive were printed directly on treated surface of PFA material, dried on line by removing water from the adhesive and then laminated with silicone release liner and die cut and packaged. The dry thickness of adhesive was designed to around one mil thickness in order to satisfy the required tackiness of approximately 450-750 grams. The inspected tack and geometry of deposited pattern all passed the intended design.

EXAMPLE #2

2 mil polyester and treated polypropylenes films were directly coated with 96 patterns with exact water base adhesive defined in example #1. The printed adhesive properties and pattern definition passed the intended requirements.

EXAMPLE #3

The water base adhesive of example #1 was mixed with blue dye in order to produce blue-colored adhesive seal products. The blue adhesive was printed on PFA, polyester, polypropylene and aluminum foil, and silicon release liners. The adhesive properties and geometry of deposited pattern passed the requirements.

EXAMPLE #4

The blue and transparent water base adhesive defined in Examples #1 and #3 were deposited on the surface of 5 mil silicone release linear directly and then dried. The coated pattern adhesive on silicone liner were dry transferred (laminated) to the treated side of PFA, polyester, polypropylene, aluminum foil, and to the surface of treated 96 multi-well plates which were made of polypropylene. The dry transfer properties of adhesives and transferred geometries all passed the intended requirements.

EXAMPLE #5

Transparent and colored water based, heat activated adhesives were deposited by method of example #1 on PFA, polyester, polypropylene, silicone release liners. The coated materials with 96 pattern heat-activated adhesives were successfully adhered to the intended surfaces of multi-well plates under 10-50 psi pressure and 300-350° F.

EXAMPLE #6

The blue adhesive defined in example #3 was coated on the silicone release linear as described in Example #1. This coated pattern adhesive was dry transferred to treated surface of 25 mil of silicone rubber. The same procedure was applied to treated side of E-TFE plus silicone rubber laminate. Dry-transfer of a 96-well pattern adhesive from release liner to E-TFE intend surfaces were passed the designed requirements.

EXAMPLE #7

Water based screen printing stencil with 96 pattern dimensions were fabricated on #100 mesh out of nylon materials. Acrylic-, water-based screen printable adhesive in transparent and blue dyed, were used on treated PFA, polypropylene, polyester and silicon release liner respectively. The adhesive properties and dimensional accuracy all passed the intended application.

EXAMPLE #8

96 multi-plates which are made of polystyrene materials were treated. A silicone release liner coated with transparent and blue water base acrylic adhesives based on Example #7 was prepared. The dry-transfer of adhesives from the silicone surface to the multi-plate surface provides a self-sealing multi well plate.

EXAMPLE #9

Heat-activated, water-based adhesive was coated with 96 pattern on silicone release liner as described in Example #4. The dry transfer of heat activated adhesive to the surface of treated-multi-well plate prepared based on Example #8 produces a self-sealing plate with heat activated adhesive.

What is claimed is:

1. A method of making a resealable sealing product for a multi-well plate, which comprises a) selecting a sealing material of an optimum film, or mat material for a specific resealable sealing application;

b) treating said sealing material; and c) directly coating said sealing material with an adhesive in a multi-well pattern format using Gravure, screen, rotary screen, flexographic, pad printing or dry transfer techniques;

wherein the adhesive covers substantially all of the surface area of the sealing material that contacts the multi-well plate but does not cover the well area of the multi-well plate; and;

wherein the sealing material is selected from the group consisting of, fluorinated and non-fluorinated materials selected from the group consisting of perfluoroalkoxy tetafluoroethylene copolymer resin (PFA), ethylenechlorotrifluoroethylene copolymer resin (E-CTFE), ethyleneterafluoroethylene copolymer resin (E-TFE), polychlorotrifluoroethylene (CTFE) homopolymers and copolymers, polyvinylidine fluoride (PVDF), tetrafluoroethylene-hexafluoropropylene (FEP), polytetafluoroethylene (PTFE), expanded PTFE, porous PTFE, woven glass impregnated with PTFE, skived or skived plus calendared PTFE, dyneon TFM, polyimides, polyolefins, acrylic polymers and copolymers, vinyl halide polymers and copolymers, ethylene-methyl methacrylate copolymers, acrylonitrilestyrene copolymers, ABS resins, ethylene-vinyl acetate copolymers, natural and synthetic rubbers, butadienestyrene copolymers, polyisoprene, synthetic polyisoprene, polybutadiene, butadiene-acrylonitrile copolymers, polychloroprene rubbers, polyisobutylene rubber, ethylenepropylene rubber, ethylene-propylene-diene rubbers, isobutylene-isoprene copolymers, polyurethane rubbers, polyamides, polyesters, polycarbonates, polyimides, polyethers, polyolefins, fluoropolymer laminates, acrylonitrile-methyl acrylate copolymers and laminates of acrylonitrile-methyl acrylate copolymers and polychlorotrifluoroethylene (CTFE) homopolymers and copolymers.

2. The method of claim 1, wherein said sealing material is treated in step b) to bond to a water-based, solvent-based, heat-activated, or UV curable adhesive.

3. The method of claim 1, further comprising modifying the sealing material with chemical, corona, plasma, flame, or mechanical treatment.

4. The method of claim 1, further comprising coating or mixing with the sealing material a wetting agent.

5. The method of claim 1, wherein the adhesive is selected from the group consisting of water-based, solvent-based, heat-activated, UV-curable, colored, and transparent adhesive materials.

6. The method of claim 1, wherein the pattern adhesive is first coated on a low surface energy substrate material and then transferred to a sealing material using dry transfer techniques.

7. The method of claim 1, further comprising die cutting the desired pattern format to match the design of wells of a multi-well plate on a transfer adhesive film material followed by laminating the patterned adhesive film to the product surface.

8. The method of claim 1, wherein the sealing product has a pattern adhesive design to be applied to the periphery of adhesive free wells and outer periphery of sealing products in the shape of connected-donut shape, disconnected donut shape, rectangular perimeter, triangular perimeter or connected to the outer border.

9. The method of claim 7, wherein the pattern format is in the form of a 6, 12, 24, 48, 96, 384 or 1536 well multi-well plate.

10. The method of claim 9, wherein wells are in the form of circles, squares or rectangles.

11. The method of claim 1, wherein the sealing product is resistant to degradation by solvents and chemicals.

12. The method of claim 11, wherein the sealing product is resistant to degradation from DMSO.

13. The method of claim 1, wherein the produced sealing product forms a seal that is selected from the group consisting of a moisture barrier seal, an oxygen barrier seal, a resealable dimple free mat, a gas permeable seal, a clear and transparent seal, a high or low temperature seal, a low protein binding seal, a tamper evidence seal, and a self-sealing seal.

* * * * *